US012786089B2

(12) United States Patent
Zhu et al.

(10) Patent No.: US 12,786,089 B2
(45) Date of Patent: Nov. 3, 2026

(54) NETWORK MONITORING METHOD AND APPARATUS, AND COMPUTER STORAGE MEDIUM

(71) Applicant: ZTE CORPORATION, Shenzhen (CN)

(72) Inventors: Xiangyang Zhu, Shenzhen (CN); Jinghai Yu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 315 days.

(21) Appl. No.: 18/689,629

(22) PCT Filed: Aug. 10, 2022

(86) PCT No.: PCT/CN2022/111550
§ 371 (c)(1),
(2) Date: Mar. 6, 2024

(87) PCT Pub. No.: WO2023/051050
PCT Pub. Date: Apr. 6, 2023

(65) Prior Publication Data

US 2025/0007807 A1 Jan. 2, 2025

(30) Foreign Application Priority Data

Sep. 30, 2021 (CN) .......................... 202111166256.6

(51) Int. Cl.
*H04L 43/087* (2022.01)
*H04L 43/0829* (2022.01)

(52) U.S. Cl.
CPC ........ *H04L 43/087* (2013.01); *H04L 43/0829* (2013.01)

(58) Field of Classification Search
CPC ..... H04L 43/0852; H04L 43/08; H04L 41/34; H04L 63/1425; H04J 3/0667
See application file for complete search history.

(56) References Cited

U.S. PATENT DOCUMENTS

2005/0099952 A1* 5/2005 Mohan .................... H04L 43/08 370/241
2018/0316592 A1* 11/2018 Ellegaard ................ H04L 43/50
(Continued)

FOREIGN PATENT DOCUMENTS

CN 113287285 A 8/2021
WO 2020200405 A1 10/2020

OTHER PUBLICATIONS

International Searching Authority. International Search Report and Written Opinion for PCT Application No. PCT/CN2022/111550 and English translation, mailed Nov. 10, 2022, pp. 1-10.
(Continued)

*Primary Examiner* — Mahran Y Abu Roumi
(74) *Attorney, Agent, or Firm* — Vivacqua Crane, PLLC

(57) ABSTRACT

A network monitoring method and apparatus and a computer-readable storage medium are disclosed. The network monitoring method may include: receiving an Operations, Administration, and Maintenance (OAM) frame from a source node, the OAM frame includes an operation code and check data corresponding to the operation code, and the OAM frame is used for checking service performance of the TSN network; performing check processing on performance of a deterministic network according to the operation code and the check data to obtain a check result; and transmitting the check result to the source node.

12 Claims, 9 Drawing Sheets

(56) References Cited

U.S. PATENT DOCUMENTS

| | | | | |
|---|---|---|---|---|
| 2019/0349392 | A1 * | 11/2019 | Wetterwald | H04L 43/0852 |
| 2021/0336881 | A1 | 10/2021 | Finn et al. | |

OTHER PUBLICATIONS

Internet Engineering Task Force Detnet Working Group. "Operations. Administration and Maintenance (OAM) for Deterministic Networks (DetNet) with MPLS Data Plane," DetNet Working Group Internet Draft, Sep. 2021.

Miao, J. "Research and Implementation of Switch System Supporting TSN Technology," and English translation, Master's Thesis, Wuhan Institute of Posts and Telecommunications, Apr. 2020.

* cited by examiner

| OpCode | DATA | | | | | |
|---|---|---|---|---|---|---|
| 0x08 | seqNo | redundNo | maxDelay | minDelay | txTimestamp | rxTimestamp |
| 0x09 | cycleValue | cycleJitter | failPacketRate | rxTimestamp | | |
| 0x0A | isBrCap | isBrEnabled | isBrChecked | addFragSize | brMultiLevel | |

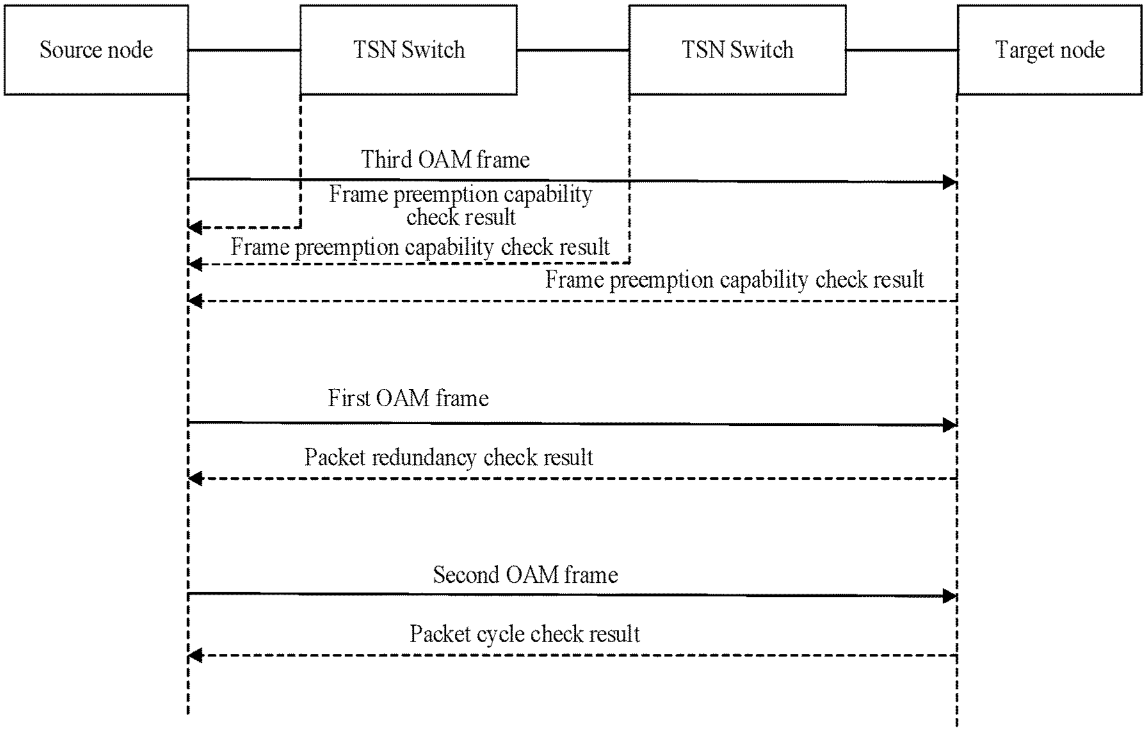

FIG. 13

<table>
<tr><td>OpCode</td><td colspan="12">DATA</td></tr>
<tr><td>0x0B</td><td colspan="4">result</td><td colspan="4">seqNo</td><td colspan="4">failReason</td></tr>
<tr><td>0x0C</td><td colspan="3">result</td><td colspan="3">cycleValue</td><td colspan="3">failPacketNo</td><td colspan="3">failReason</td></tr>
<tr><td>0x0D</td><td colspan="3">result</td><td colspan="3">failNode</td><td colspan="3">failPort</td><td colspan="3">failReason</td></tr>
</table>

FIG. 14

NETWORK MONITORING METHOD AND APPARATUS, AND COMPUTER STORAGE MEDIUM

CROSS-REFERENCE TO RELATED APPLICATION

This application is a national stage filing under 35 U.S.C. § 371 of international application number PCT/CN2022/111550, filed Aug. 10, 2022, which claims priority to Chinese patent application No. 202111166256.6, filed Sep. 30, 2021. The contents of these applications are incorporated herein by reference in their entirety.

TECHNICAL FIELD

The present disclosure relates to the technical field of communications, and more particularly, to a network monitoring method and apparatus and a computer-readable storage medium.

BACKGROUND

Time-sensitive networking (TSN) is an emerging industrial communication technology that is being actively advanced by the international industry. TSN allows both periodic and aperiodic data to be transmitted in the same network, providing advantages of deterministic transmission to standard Ethernet. Through a vendor-independent standardization process, TSN has become a widely focused key technology and has been extensively applied in areas such as automotive Ethernet, industrial Ethernet, and carrier networks. With the extensive research and deployment of TSN across various demanding service scenarios, the need for its security and reliability has grown. However, in the existing technology, there is a lack of TSN network service monitoring, making it challenging to gather information on the service state of TSN networks, thereby compromising the reliability and security of TSN in various service scenarios.

SUMMARY

The following is a summary of the subject matters described in detail herein. This summary is not intended to limit the scope of protection of the claims.

Embodiments of the present disclosure provide a network monitoring method and apparatus and a computer-readable storage medium.

In accordance with a first aspect of the present disclosure, an embodiment provides a network monitoring method, which is applied to a target node deployed in a time-sensitive networking (TSN) network, the method including: receiving an Operations, Administration, and Maintenance (OAM) frame from a source node, where the OAM frame includes an operation code and check data corresponding to the operation code, and the OAM frame is used for checking service performance of the TSN network; performing check processing on performance of a deterministic network according to the operation code and the check data to obtain a check result; and transmitting the check result to the source node.

In accordance with a second aspect of the present disclosure, an embodiment provides a network monitoring method, which is applied to a source node deployed in a TSN network, the method including: transmitting an OAM frame to a target node, where the OAM frame includes an operation code and check data corresponding to the operation code, and the OAM frame is used for checking service performance of the TSN network, so as to enable the target node to perform check processing on performance of a deterministic network according to the operation code and the check data to obtain a check result and transmit the check result to the source node; and receiving the check result from the target node.

In accordance with a third aspect of the present disclosure, an embodiment provides a network monitoring apparatus, including a memory, a processor, and a computer program stored in the memory and executable by the processor, where the computer program, when executed by the processor, causes the processor to carry out the network monitoring method according to any of the embodiments of the present disclosure.

In accordance with a fourth aspect of the present disclosure, an embodiment provides a computer-readable storage medium storing a computer program which, when executed by a processor, causes the processor to carry out the network monitoring method according to any of the embodiments of the present disclosure.

Additional features and advantages of the present disclosure will be set forth in the subsequent description, and in part will become apparent from the description, or may be learned by practice of the present disclosure. The purposes and other advantages of the present disclosure can be realized and obtained by structures particularly noted in the description, the claims and the accompanying drawings.

BRIEF DESCRIPTION OF DRAWINGS

The accompanying drawings are used to provide further understanding of the technical schemes of the present disclosure and constitute a part of the description. The accompanying drawings are used to explain the technical schemes of the present disclosure together with the embodiments of the present disclosure, and do not constitute a restriction on the technical schemes of the present disclosure.

FIG. 13 is a schematic diagram of an interactive process of OAM frames for TSN network monitoring according to an embodiment of the present disclosure;

FIG. 14 is a schematic diagram of an OAM frame encapsulation format as a check result according to an embodiment of the present disclosure;

DETAILED DESCRIPTION

In order to make the objectives, technical schemes and advantages of the present disclosure more apparent, the present disclosure is further described in detail in conjunction with the accompanying drawings and embodiments. It should be understood that the particular embodiments described herein are only intended to explain the present disclosure, and are not intended to limit the present disclosure.

It is to be noted that although a functional module division is shown in a schematic diagram of an apparatus and a logical order is shown in a flowchart, the steps shown or described may be executed, in some cases, with a different module division from that of the apparatus or in a different order from that in the flowchart. The terms such as "first" and "second" in the description, claims and above-mentioned drawings are intended to distinguish between similar objects and are not necessarily to describe a specific order or sequence.

The present disclosure provides a network monitoring method, where a target node, in response to receiving an OAM frame from a source node, can extract an operation code and check data from the OAM frame, and use the operation code and check data to check the performance of a deterministic network to obtain and transmit a check result to the source node. By extending the OAM frame, different OAM frames can have different operation codes, which correspond to check data. Therefore, the check data of different OAM frames can vary. As a result, the target node can check different performance aspects of the deterministic network based on the different operation codes and check data in the OAM frames. This enables diversified monitoring of TSN network service performance, allowing comprehensive monitoring of TSN network service conditions, facilitating management of TSN for users and enhancing its reliability.

Figure 1:
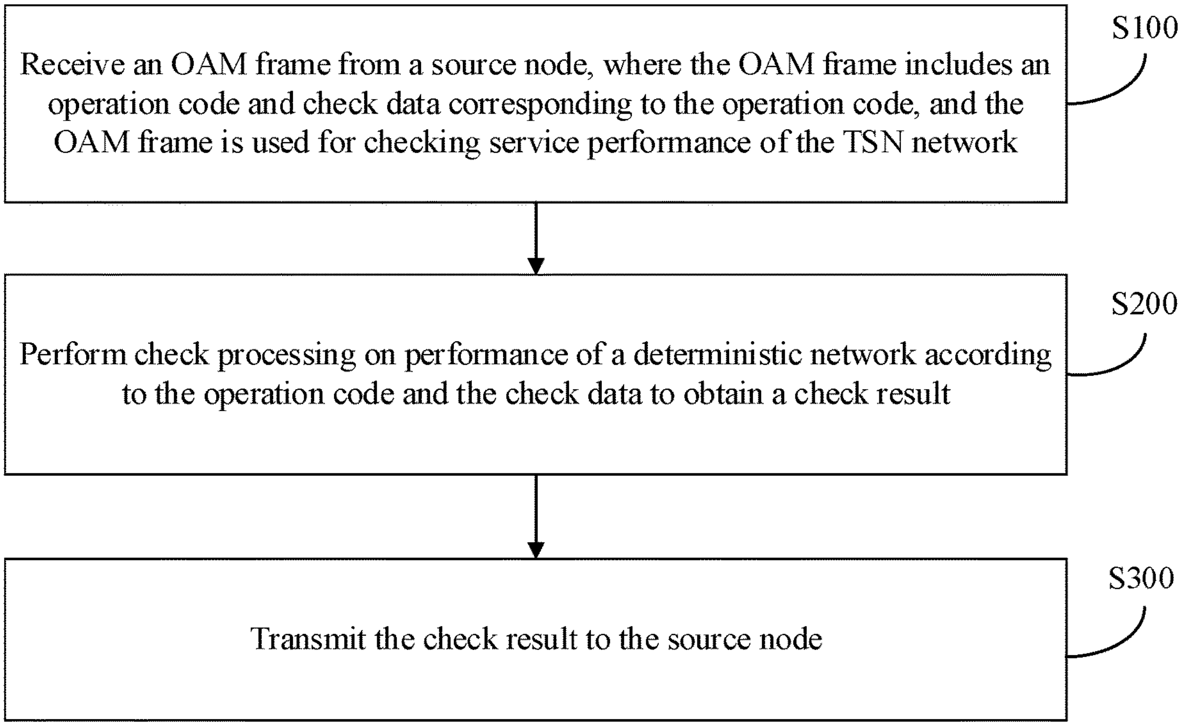
FIG. 1 is a flowchart of a network monitoring method applied to a target node according to an embodiment of the present disclosure.

Now referring to FIG. 1. FIG. 1 shows a flowchart of a network monitoring method according to an embodiment of the present disclosure. The network monitoring method may be applied to a target node. The method includes but is not limited to the following steps of S100 to S300.

At S100, an OAM frame is received from a source node, where the OAM frame includes an operation code and check data corresponding to the operation code, and the OAM frame is used for checking service performance of the TSN network.

It is understood that the OAM frame from the source node includes an operation code and check data, where the operation code is located in an OpCode field of the OAM frame, and can be used to indicate the type of the OAM frame. The type of the OAM frame is defined by extending the operation code, for example, in response to the operation code being the first operation code, it can indicate that the OAM frame is used for packet redundancy monitoring. If packet redundancy monitoring is needed, corresponding packet redundancy check data are required in the OAM frame. Therefore, the operation code is corresponding to the check data, and the check data corresponding to different operation codes can be different. The check data are located in the DATA field of the OAM frame, and the DATA field may contain check data corresponding to the operation code and may also contain all check data required for performance monitoring of the deterministic network, so that the target node can use the data carried by the OAM frame to carry out corresponding check processing on the service performance of the TSN network.

It should be noted that both the source node and the target node are deployed in a TSN network. The source node can be a network node that acts as a source to transmit OAM frames, that is, the previous transmission node of the target node in the transmission link, or the starting node of the transmission link, while the target node can be a network node that acts as a sink to accept OAM frames, that is, the next receiving node of the source node to transmit OAM frames in the transmission link, or the terminating node of the transmission link. For example, in a transmission link, a first node transmits an OAM frame to a second node and the second node transmits the OAM frame to a third node, where between the first node and the second node, the first node is the source node and the second node is the target node; between the second node and the third node, the second node is the source node and the third node is the target node; and in addition, between the first node, the second node and the third node, the first node is the source node and the third node is the target node.

At S200, check processing is performed on performance of a deterministic network according to the operation code and the check data to obtain a check result.

At S300, the check result is transmitted to the source node.

It can be understood that the target node can check the performance of the deterministic network by using the received OAM frames, and the check data carried in the OAM frames are different with different operation codes. Therefore, the target node can identify the type of the OAM frame according to the operation codes in the OAM frame, thereby using the check data in the OAM frame to carry out corresponding check and monitoring of the deterministic network performance to obtain a check result, and the target node will transmit the check result back to the source node. For example, the operation code carried in an OAM frame is the first operation code, the first operation code indicates that the OAM frame is used for monitoring the packet redundancy, and the OAM frame carries the first check data corresponding to the first operation code, where the first check data may include packet sequence number, number of redundant packets, packet receiving time and other related data used for monitoring the packet redundancy. Therefore, the target node can use the first check data in the OAM frame to monitor the packet redundancy in response to receiving the OAM frame carrying the first operation code, and the target node can also transmit the check result obtained by the check processing to the source node, which is convenient for users to understand the service performance of the TSN network, adjust and manage the TSN accordingly, and improves the reliability of the TSN network. By extending the OAM frame, the information carried by the OAM frame is enriched, and the target node can monitor the different aspects of the service performance of TSN according to the extended OAM frame, which improves the diversification of TSN monitoring features. It should be noted that the performance of the deterministic network that the target node can monitor by using the operation code and check data in the OAM frames includes packet redundancy, packet cycle and frame preemption capability. For example, in response to the operation code in the OAM frame being the first operation code and the check data include packet sequence number, number of redundant packets, packet transmission time, and packet receiving time, the target node can monitor the packet redundancy of the TSN by using the operation code and check data in the OAM frame to obtain a packet redundancy check result; in response to the operation code in the OAM frame being the second operation code and the check data include packet transmission time, packet transmit cycle value, packet cycle jitter range, and fail packet rate, the target node can monitor the packet cycle of the TSN by using the operation code and the check data in the OAM frame to obtain a packet cycle check result; and in addition, when the operation code in the OAM frame is the third operation code and the check data include the frame preemption configuration parameter and the frame preemption parameter check state of the source node, the target node can check the frame preemption capability of the TSN by using the operation code and the check data in the OAM frame to obtain the frame preemption capability check result. The operation code and check data in the OAM frame can also be extended according to the actual situation, such that the target node can monitor and check the service performance of TSN, enriching the monitoring features for TSN network and improving the reliability of TSN network.

Figure 2:
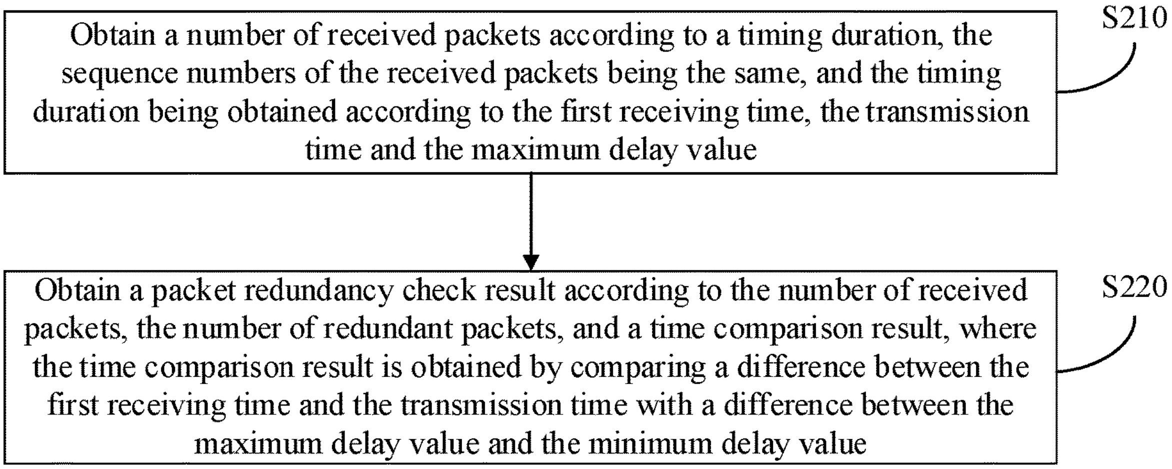
FIG. 2 is a schematic diagram of the specific implementation process of step S200 in FIG. 1.

Now referring to FIG. 2. Step S200 in the embodiment shown in FIG. 1 further includes but is not limited to the following steps of S210 to S220.

At S210, a number of received packets is obtained according to a timing duration, the sequence numbers of the received packets being the same, and the timing duration being obtained according to the first receiving time, the transmission time and the maximum delay value.

At S220, a packet redundancy check result is obtained according to the number of received packets, the number of redundant packets, and a time comparison result, where the time comparison result is obtained by comparing a difference between the first receiving time and the transmission time with a difference between the maximum delay value and the minimum delay value.

It can be understood that in response to the operation code carried in the OAM frame being the first operation code, the check data in the OAM frame includes sequence number, number of redundant packets, first receiving time, transmission time, maximum delay value, and minimum delay value. When the target node receives the OAM frame carrying the first operation code, the target node can extract the sequence number, number of redundant packets, first receiving time, transmission time, maximum delay value, and minimum delay value from the OAM frame. According to the first receiving time, the transmission time and the maximum delay value, the target node obtains the timing duration of the packet redundancy monitoring, and in the timing duration, the number of packets with the same sequence number received by the target node is counted in real-time to obtain the number of received packets.

When the number of received packets counted in real-time is greater than the number of redundant packets, it can be considered that the packet redundancy check fails, and the target node transmits the packet redundancy check failure result to the source node. When the number of received packets counted in real-time is less than the number of redundant packets, it can be considered that the packet redundancy check is not completed, and the receiving of packets continues, and the number of received packets is updated in real-time according to the packet sequence number. In addition, in order to monitor the reliability of TSN in redundancy transmission, in response to the target node receiving an OAM frame and the number of received packets not exceeding the number of redundant packets, the target node compares the difference between the first receiving time and the transmission time of the OAM frame and the difference between the maximum delay value and the minimum delay value to obtain a time comparison result. When the difference between the first receiving time and the transmission time is greater than the difference between the maximum delay value and the minimum delay value, it can be considered that the delay requirement of redundancy transmission is not met, and the time comparison result is a comparison failure result. When the time comparison result is a comparison failure result, it can be considered that the current TSN packet redundancy performance cannot meet the service requirements, and the packet redundancy check fails, and the target node transmits the packet redundancy check failure result to the source node. When the difference between the first receiving time and the transmission time is less than or equal to the difference between the maximum delay value and the minimum delay value, it can be considered that the delay requirement of redundancy transmission is met, and the time comparison result is a comparison success result. When the number of received packets is equal to the number of redundant packets and the time comparison result is a success result, it can be considered that the current TSN packet redundancy performance can meet the service requirements, and the packet redundancy check is successful, thus obtaining a packet redundancy check success result.

Figure 3:
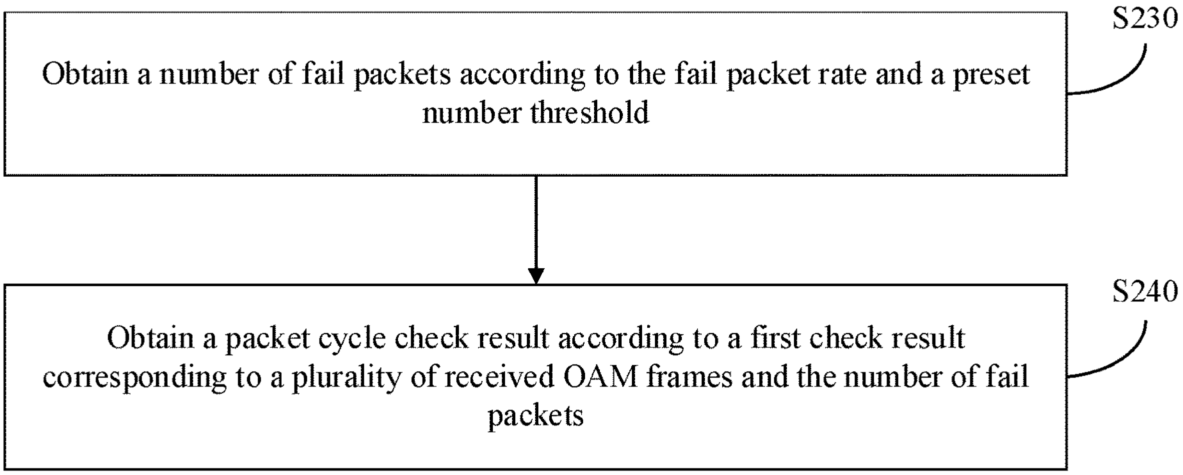
FIG. 3 is a schematic diagram of the specific implementation process of step S200 in FIG. 1.

Now referring to FIG. 3. Step S200 in the embodiment shown in FIG. 1 further includes but is not limited to the following steps of S230 to S240.

At S230, a number of fail packets is obtained according to the fail packet rate and a preset number threshold.

At S240, a packet cycle check result is obtained according to a first check result corresponding to a plurality of received OAM frames and the number of fail packets.

It can be understood that, in response to the operation code carried in the OAM frame being the second operation code, the check data corresponding to the second operation code in the OAM frame includes second receiving time, packet cycle value, cycle jitter value, and fail packet rate. When a target node receives an OAM frame carrying a second operation code, the target node can extract the second receiving time, packet cycle value, a cycle jitter value, and a fail packet rate from the OAM frame, so that the target node can obtain a packet cycle condition according to the packet cycle value and the cycle jitter value, i.e. a difference between the packet cycle value and the cycle jitter value is taken as a lower limit value of the packet cycle condition, and a sum of the packet cycle value and the cycle jitter value is taken as an upper limit value of the packet cycle condition. In addition, the target node can calculate the number of fail packets according to the fail packet rate and the preset number threshold. The target node can record the receiving time of all received OAM frames, and take the receiving time of the previous OAM frame as a third receiving time. By determining whether the difference between the second receiving time and the third receiving time meets the packet cycle condition, that is, determining whether the difference between the second receiving time and the third receiving time is located between the upper limit value and the lower limit value of the packet cycle condition, a corresponding first check result is obtained. For example, if the fail packet rate is 10% and the preset number threshold is 10, the number of fail packets is 1. It can be considered that the packet cycle monitoring needs to monitor the cycle of 10 consecutive OAM frames, and one of the OAM frames is allowed to have errors, that is, it is acceptable that the difference between the receiving times of two adjacent OAM frames in the 10 OAM frames in the packet cycle monitoring does not meet the packet cycle condition. When the difference between the second receiving time and the third receiving time satisfies the packet cycle condition, it can be considered that the packet cycle check of the current OAM frame is successful, and the first check result is a first check success result. When the difference between the second receiving time and the third receiving time does not satisfy the packet cycle condition, it can be considered that the current OAM frame does not satisfy the packet cycle, so that the current OAM frame is a fail packet, and the first check result is a first check failure result. The target node can compare in real-time the number of the first check results and the number of fail packets corresponding to a plurality of received OAM frames, that is, the number of fail packets that have been detected so far and the number of fail packets are compared in real-time. When the number of first check failure results is greater than the number of fail packets, it can be considered that the current packet cycle check of the TSN has failed, and a packet cycle check failure result is obtained. When the number of first check failure results is less than or equal to the number of fail packets, and the number of first check results is equal to the preset number threshold, it can be considered that the current packet cycle check of the TSN is successful, and a packet cycle check success result is obtained. Therefore, by extending the OAM frame operation code and check data, the TSN packet cycle check can be realized, and the service performance of the TSN can be obtained, which is convenient for users to adjust the TSN network and improves the reliability of the TSN.

Figure 4:
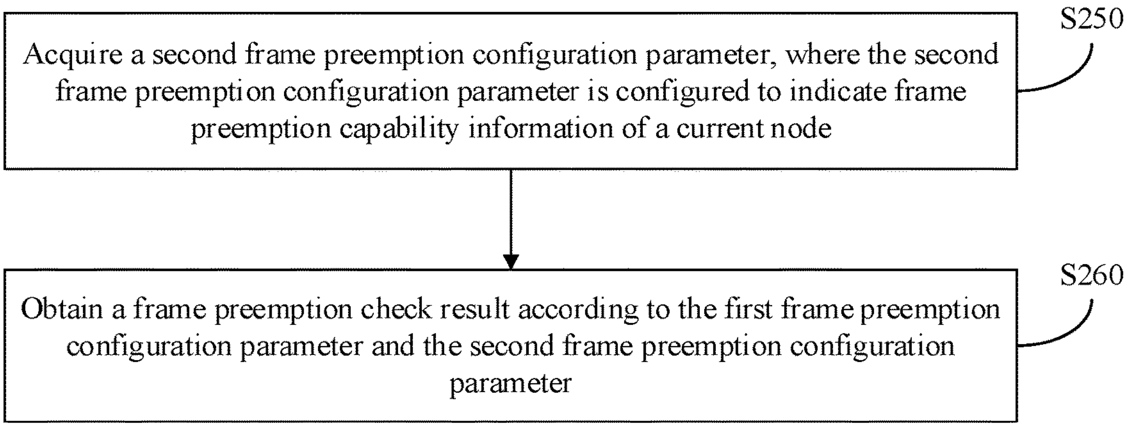
FIG. 4 is a schematic diagram of the specific implementation process of step S200 in FIG. 1.

Now referring to FIG. 4. Step S200 in the embodiment shown in FIG. 1 further includes but is not limited to the following steps of S250 to S260.

At S250, a second frame preemption configuration parameter is acquired, where the second frame preemption configuration parameter is configured to indicate frame preemption capability information of a current node.

At S260, a frame preemption check result is obtained according to the first frame preemption configuration parameter and the second frame preemption configuration parameter.

It can be understood that when the operation code is the third operation code, the corresponding check data include the first frame preemption configuration parameter, and the first frame preemption configuration parameter is configured to indicate frame preemption capability information of the source node, that is, when the OAM frame carries the third operation code and the first frame preemption configuration parameter, the OAM frame is used to check the frame preemption capability of the TSN. Therefore, when the target node receives the OAM frame carrying the third operation code, the target node extracts the first frame preemption configuration parameter from the check data in the OAM frame, and obtains the frame preemption capability information of the current node, that is, obtains the second frame preemption configuration parameter. The target node determines whether the frame preemption capability of the target node is greater than or equal to the frame preemption capability of the source node by analyzing and processing the first frame preemption configuration parameter and the second frame preemption configuration parameter. When it is determined that the frame preemption capability of the target node is greater than or equal to the frame preemption capability of the source node, it is considered that the frame preemption capability check of the current TSN is successful, and a frame preemption check success result is obtained. When it is determined that the frame preemption capability of the target node is less than the frame preemption capability of the source node, it is considered that the frame preemption capability check of the current TSN has failed, and a frame preemption check failure result is obtained. Herein, the frame preemption check failure result includes the reason for the frame preemption check failure. For example, in response to the frame preemption configuration parameter including a plurality of configuration information entries, and it is determined that the frame preemption capability of the target node is less than the frame preemption capability of the source node because the first configuration information in the second frame preemption configuration parameter is smaller than the second configuration information in the first frame preemption configuration parameter, the first configuration information in the second frame preemption configuration parameter may be considered as the reason for the frame preemption check failure, and the first configuration information may be recorded in the frame preemption check failure result. Therefore, the second frame preemption information may be included in the reason for the frame preemption check failure. By transmitting the OAM frame with the specified operation code and carrying the corresponding check data to the target node, the target node is enabled to carry out the performance check processing of the deterministic network according to the OAM frame, which helps to meet user requirements. In addition, recording the reasons for check failure and transmitting the check result and the check failure reason to the source node can greatly assist users in adjusting and managing TSN and improve the reliability of TSN.

Figure 5:
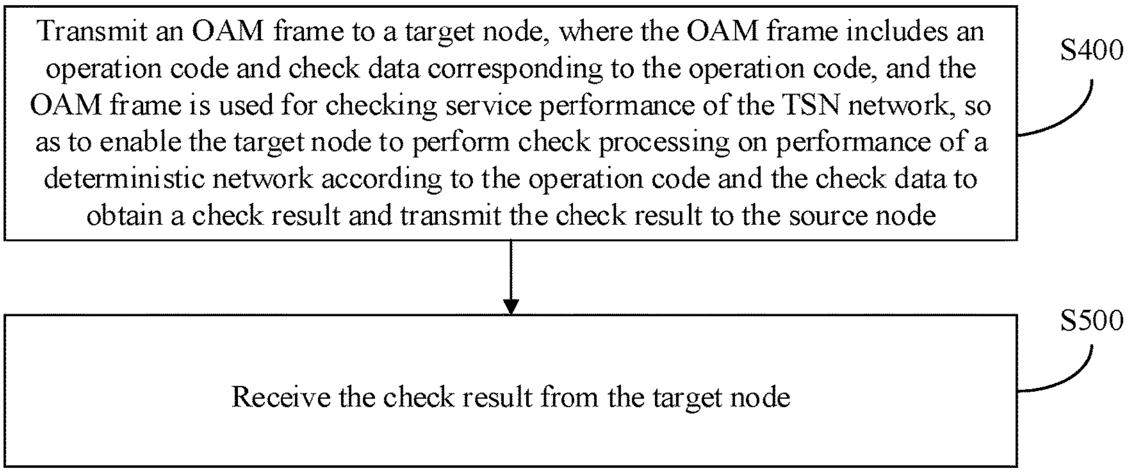
FIG. 5 is a flowchart of a network monitoring method applied to a source node according to an embodiment of the present disclosure.

Now referring to FIG. 5. FIG. 5 shows a flowchart of a network monitoring method according to an embodiment of the present disclosure. The network monitoring method may be applied to a source node. The method includes but is not limited to the following steps of S400 to S500.

At S400, an OAM frame is transmitted to a target node, where the OAM frame includes an operation code and check data corresponding to the operation code, and the OAM frame is used for checking service performance of the TSN network, so as to enable the target node to perform check processing on performance of a deterministic network according to the operation code and the check data to obtain a check result and transmit the check result to the source node.

At S500, the check result from the target node is received.

It can be understood that both the source node and the target node are deployed in the TSN network, and the OAM frame sent by the source node to the target node includes an operation code and check data, and the operation code is configured to indicate the type of the OAM frame. Therefore, the target node can check and monitor the corresponding aspect of the performance of the deterministic network with the operation code in the OAM frame, for example, the source node transmits the OAM frame carrying the first operation code to the target node, so that the target node can check and process the packet redundancy of the TSN according to the first operation code. Therefore, by extending the operation code to define the type of OAM frame and carry the check data corresponding to the operation code, the target node can check different performance aspects of the deterministic network according to different operation codes and check data in response to receiving the OAM frame, thus enriching the monitoring features required by TSN services. After the target node completes the corresponding performance monitoring processing, the source node can receive the check result from the target node for the performance monitoring. Through the check result obtained, we can know the current TSN service performance, which is convenient for users to adjust TSN in a timely manner and improves the reliability of TSN.

Figure 6:
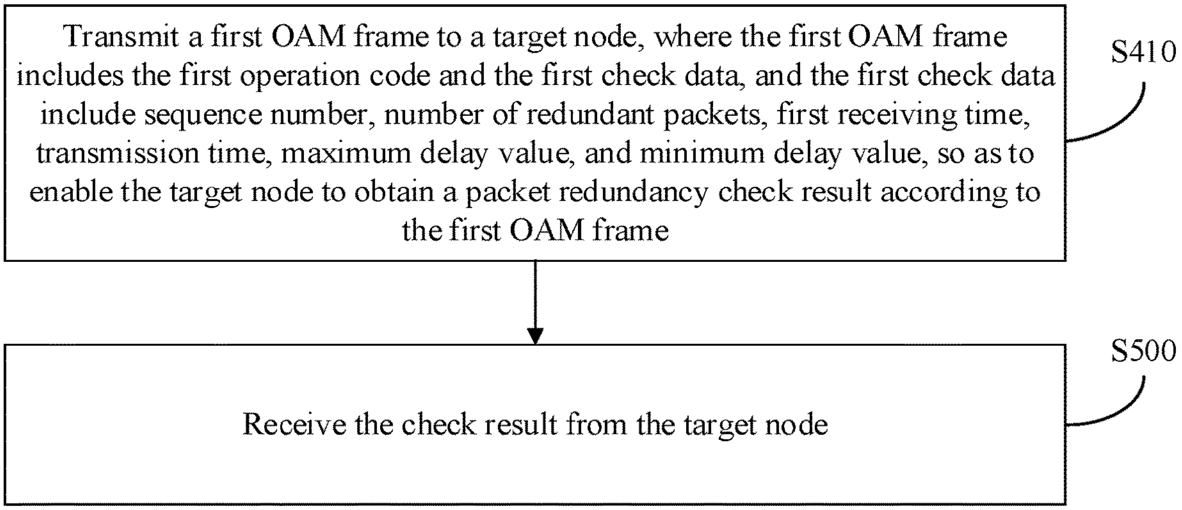
FIG. 6 is a schematic diagram of the specific implementation process of step S400 in FIG. 5.

Now referring to FIG. 6. Step S400 in the embodiment shown in FIG. 5 further includes but is not limited to the following step of S410.

At S410, a first OAM frame is transmitted to a target node, where the first OAM frame includes the first operation code and the first check data, and the first check data include sequence number, number of redundant packets, first receiving time, transmission time, maximum delay value, and minimum delay value, so as to enable the target node to obtain a packet redundancy check result according to the first OAM frame.

It is understood that, different types of OAM frames carry different operation codes, that is, different OAM frames are used to check different performance aspects of the deterministic network. The first OAM frame can be used to check the packet redundancy performance of the TSN, where the operation code carried by the first OAM frame is the first operation code and the first OAM frame carries the first check data corresponding to the first operation code. The first check data include sequence number, number of redundant packets, first receiving time, transmission time, maximum delay value, and minimum delay value. The source node transmits the first OAM frame to the target node, so that the target node can extract the sequence number, the number of redundant packets, the first receiving time, the transmission time, the maximum time delay value and the minimum time delay value after receiving the first OAM frame, and obtain the timing duration according to the first receiving time, the transmission time and the maximum time delay value, thereby obtaining the number of received packets by counting in real-time the number of packets with the same sequence number received within the timing duration. Therefore, the target node can determine whether the packet redundancy check is successful or not through the number of received packets, and the number of redundant packets, first receiving time, transmission time, maximum delay value and minimum delay value extracted from the first OAM frame, thereby obtaining the corresponding packet redundancy check result. For example, in the check process, if the number of received packets counted in real-time is greater than the number of redundant packets, it can be considered that the packet redundancy check has failed, and the source node can get the packet redundancy check failure result sent by the target node, and at the same time stop the packet redundancy check and stop transmitting the first OAM frame to the target node. For another example, when the number of received packets counted in real-time in the check process has not exceeded the number of redundant packets, that is, the source node has not received the packet redundancy check result from the target node, it can be considered that the packet redundancy check is not completed yet, and then the source node continues to transmit the first OAM frame to the target node until the packet redundancy check result from the target node is received. Therefore, by extending the operation code type of the OAM frame and extending the check data corresponding to different types of operation codes in the OAM frame, the target node can check the packet redundancy according to the data carried in the OAM after receiving the OAM frame, thus realizing the check processing for the performance of the deterministic network and improving the reliability of the TSN.

Figure 7:
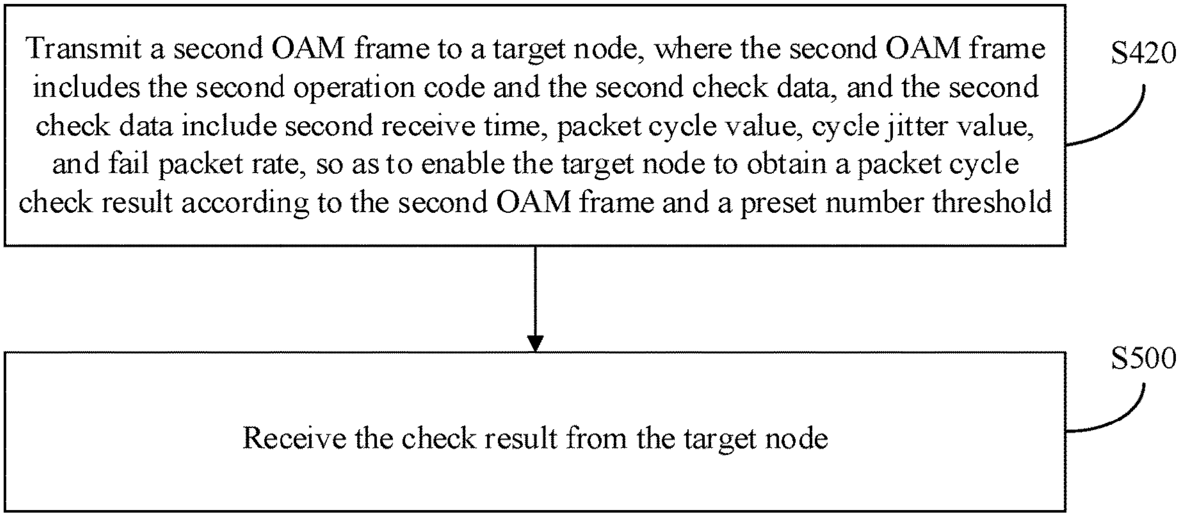
FIG. 7 is a schematic diagram of the specific implementation process of step S400 in FIG. 5.

Now referring to FIG. 7. Step S400 in the embodiment shown in FIG. 5 further includes but is not limited to the following step of S420.

At S420, a second OAM frame is transmitted to a target node, where the second OAM frame includes the second operation code and the second check data, and the second check data include second receiving time, packet cycle value, cycle jitter value, and fail packet rate, so as to enable the target node to obtain a packet cycle check result according to the second OAM frame and a preset number threshold.

It can be understood that the operation code carried in the second OAM frame is the second operation code, and the second check data corresponding to the second operation code includes the second receiving time, packet cycle value, packet cycle jitter value, and fail packet rate, so that when the source node transmits the second OAM frame to the target node, the target node can extract the second receiving time, packet cycle value, packet cycle jitter value, and fail packet rate, and carry out the packet cycle check according to the preset number threshold, the fail packet rate, the second receiving time of the current second OAM frame, the receiving time of the previous second OAM frame, the packet cycle value and the cycle jitter value to obtain the packet cycle check result. For example, the target node can obtain the packet cycle condition according to the packet cycle value and the cycle jitter value and calculate the number of fail packets according to the preset number threshold and the fail packet rate, and obtain the first check result by comparing the difference between the second receiving time and the receiving time of the previous OAM frame against the packet cycle condition, so that the target node can obtain the packet cycle check success result under the condition that the number of the first check results meets the preset number threshold and the fail packet rate. Therefore, by extending the OAM frame operation code and check data, the TSN packet cycle check can be realized, and the service performance of the TSN can be obtained, which improves the reliability of the TSN.

Figure 8:
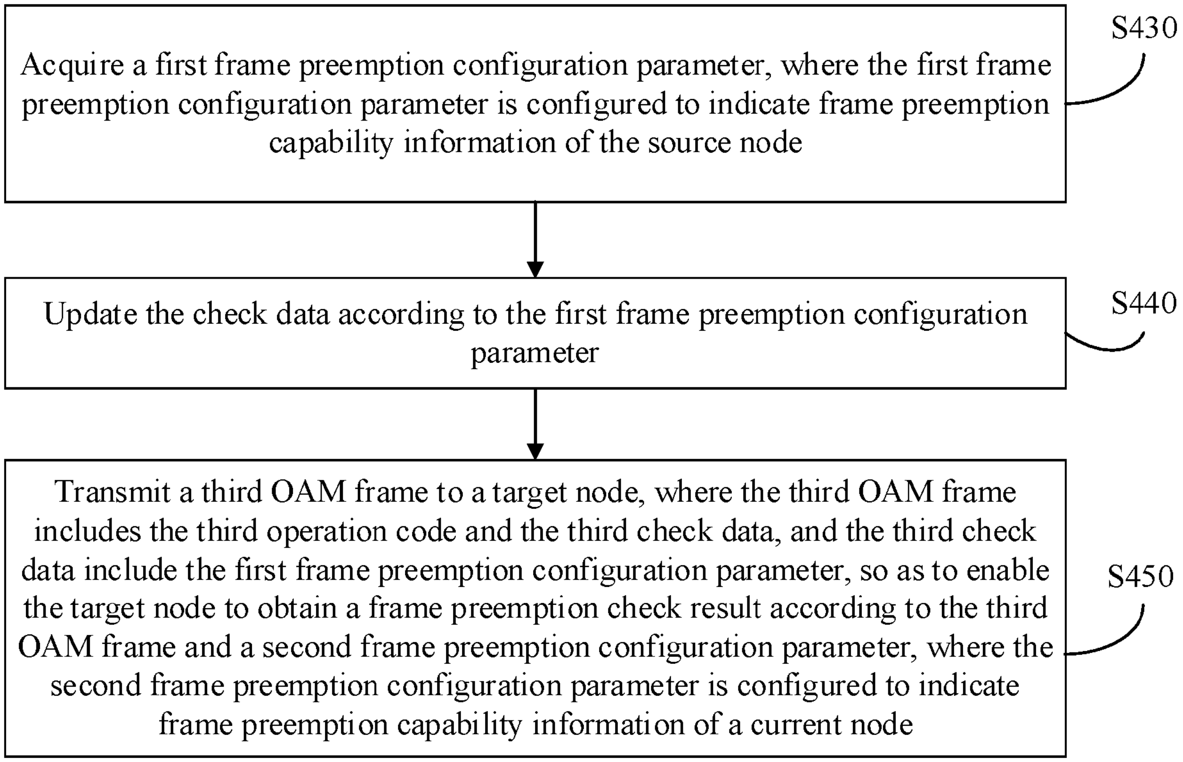
FIG. 8 is a schematic diagram of the specific implementation process of step S400 in FIG. 5.

Now referring to FIG. 8. Step S400 in the embodiment shown in FIG. 5 further includes but is not limited to the following steps of S430 to S450.

At S430, a first frame preemption configuration parameter is acquired, where the first frame preemption configuration parameter is configured to indicate frame preemption capability information of the source node.

At S440, the check data are updated according to the first frame preemption configuration parameter.

At S450, a third OAM frame is transmitted to a target node, where the third OAM frame includes the third operation code and the third check data, and the third check data include the first frame preemption configuration parameter, so as to enable the target node to obtain a frame preemption check result according to the third OAM frame and a second frame preemption configuration parameter, where the second frame preemption configuration parameter is configured to indicate frame preemption capability information of a current node.

It can be understood that before the source node transmits the third OAM frame carrying the third operation code, the source node acquires the first frame preemption configuration parameter, i.e. frame preemption capability information of the current source node. The check data in the third OAM frame is updated using the first frame preemption configuration parameter. For example, in response to the check data carrying no frame preemption configuration information, the first frame preemption configuration parameter is to be stored in the check data; and in response to the frame preemption configuration information being carried in the check data already, the existing frame preemption configuration parameter in the check data is to be replaced with the first frame preemption configuration parameter, thereby obtaining the third check data, that is, the third check data contain the first frame preemption configuration parameter. Therefore, the source node transmits the third OAM frame carrying the third operation code and the third check data to the target node, so that the target node can perform the frame preemption capability check processing of the TSN according to the second frame preemption configuration parameter and the third OAM frame of the current node, thereby obtaining the frame preemption check result. For example, the target node compares the second frame preemption configuration parameter with the first frame preemption configuration parameter in the third OAM frame, and if the frame preemption capability indicated by the second frame preemption configuration parameter is greater than or equal to the frame preemption capability indicated by the first frame preemption configuration parameter, it is considered that the frame preemption capability check of the TSN is successful, thus obtaining a frame preemption check success result. By transmitting the OAM frame carrying the third operation code and carrying the check data with the first frame preemption configuration parameter to the target node, the target node can carry out the frame preemption capability check processing of the TSN according to the third OAM frame, thus meeting the use requirements of users.

Figures 9, 10:
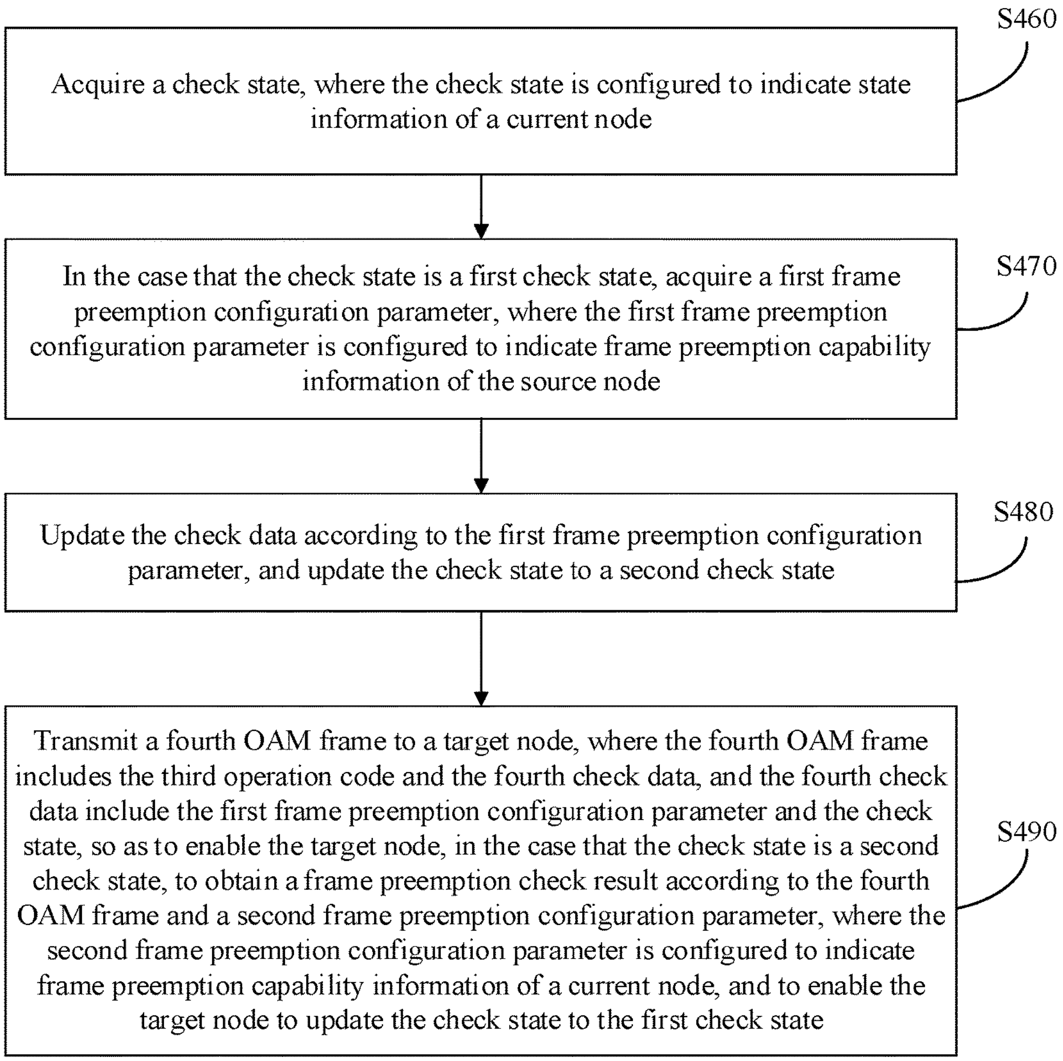
FIG. 9 is a schematic diagram of the specific implementation process of step S400 in FIG. 5.
FIG. 10 is a schematic diagram of an OAM frame encapsulation format for checking the performance of a deterministic network according to an embodiment of the present disclosure.

Now referring to FIG. 9. Step S400 in the embodiment shown in FIG. 5 further includes but is not limited to the following steps of S460 to S490.

At S460, a check state is acquired, where the check state is configured to indicate state information of a current node.

At S470, in response to the check state being a first check state, a first frame preemption configuration parameter is acquired, where the first frame preemption configuration parameter is configured to indicate frame preemption capability information of the source node.

At S480, the check data are updated according to the first frame preemption configuration parameter, and the check state is updated to a second check state.

At S490, a fourth OAM frame is transmitted to a target node, where the fourth OAM frame includes the third operation code and the fourth check data, and the fourth check data include the first frame preemption configuration parameter and the check state, so as to enable the target node, in response to the check state being a second check state, to obtain a frame preemption check result according to the fourth OAM frame and a second frame preemption configuration parameter, where the second frame preemption configuration parameter is configured to indicate frame preemption capability information of a current node, and to enable the target node to update the check state to the first check state.

It can be understood that when the operation code is a third operation code, the check data may be fourth check data corresponding to the third operation code, and the fourth check data include a first frame preemption configuration parameter and a check state, so that the source node can transmit the fourth OAM frame carrying the third operation code to the target node, to enable the target node to perform frame preemption capability check processing according to the fourth OAM frame. Herein, the source node obtains the state information of the current node, i.e. the check state. When the check state is the first check state, the current node is considered to be in the transmitting state, the frame preemption capability information of the current node, i.e. the first frame preemption configuration parameter, is obtained, and the check data are updated with the first frame preemption configuration parameter. The source node also updates the check state to a second check state, which means that the current node is in the receiving state, so that the node receiving the OAM frame is in a receiving state, performs frame preemption capability check, and updates the check data with the second check state. In response to the check data carrying no frame preemption configuration information, the first frame preemption configuration parameter is to be stored in the check data; and in response to the frame preemption configuration information being carried in the check data already, the existing frame preemption configuration parameter in the check data is to be replaced with the first frame preemption configuration parameter, thereby obtaining the fourth check data, that is, the fourth check data contain the first frame preemption configuration parameter and the check state. When the target node receives the fourth OAM frame from the source node, the target node performs frame preemption capability check according to the third operation code and the second check state carried in the fourth OAM frame, obtains the second frame preemption configuration parameter, and obtains the frame preemption check result by comparing the second frame preemption configuration parameter with the first frame preemption configuration parameter. If the current node can be a network node serving as a source to transmit the fourth OAM frame, the check state is updated from the second check state to the first check state, whereby the current node updates the first frame preemption configuration parameter in the fourth OAM frame by using the frame preemption configuration parameter of the current node in response to the check state being the first check state, and updates the first check state to the second check state to obtain the updated fourth OAM frame. Therefore, the current node transmits the updated fourth OAM frame to the next network node, so that the subsequent node completes the check processing of frame preemption capability. By extending the check data corresponding to the operation code, the nodes in the transmission link are enabled to complete the corresponding frame preemption capability check processing according to the check state, which meets user requirements and improves the reliability of TSN.

Now referring to FIG. 10. FIG. 10 is a schematic diagram of an OAM frame encapsulation format for checking the performance of a deterministic network according to an embodiment of the present disclosure.

It can be understood that the operation code is stored in an OpCode field in the OAM frame, different operation codes are represented by changing the value of OpCode to indicate different types of OAM frames, and the check data stored in a DATA field correspond to the operation code, so that the node can determine the performance check processing needed by the current node according to the value of OpCode, that is, the operation code, and use the check data in the DATA field to carry out the check processing. For example, when the OpCode value in the OAM frame is 0x08, the operation code can be labeled as the first operation code, indicating that the frame is configured for packet redundancy check monitoring, then the DATA field in the OAM can store the sequence number seqNo, the number of redundant packets redundNo, the maximum delay value maxDelay, the minimum delay value minDelay, the packet transmission time txTimestamp and the packet receiving time rxTimestamp. For another example, when the OpCode value in the OAM frame is 0x09, the operation code can be labeled as the second operation code, indicating that the OAM frame is configured for packet cycle check monitoring, and then the DATA field in the OAM frame can store the packet cycle value cycleValue, the cycle jitter value cycleJitter, the fail packet ratefailPacketRate and the packet receiving time rxTimestamp. In addition, when the OpCode value in the OAM frame is 0x0A, the operation code can be labeled as the third operation code, indicating that the OAM frame is configured for checking and monitoring the frame preemption capability, and then the DATA field in the OAM frame can store frame preemption configuration parameters, including the frame preemption support state isBrCap, the frame preemption enabled state isBrEnabled, the frame preemption checked state isBrChecked, the frame preemption parameter addFragSize and the multi-level frame preemption level brMultiLevel.

It should be noted that the sequence number in the OAM frame carrying the first operation code can be carried by the R-TAG defined in the TSN redundancy protocol 802.1CB.

It should be noted that in the process of constructing OAM frames, the check data can be obtained through user settings or control system configurations. When an OAM frame is received, the node receiving the OAM frame will identify the OAM frame and the type of the OAM frame. If the check feature corresponding to the operation code in the node is configured to be enabled, the check data of the DATA field in the OAM frame is to be extracted for performing the check.

Figure 11:
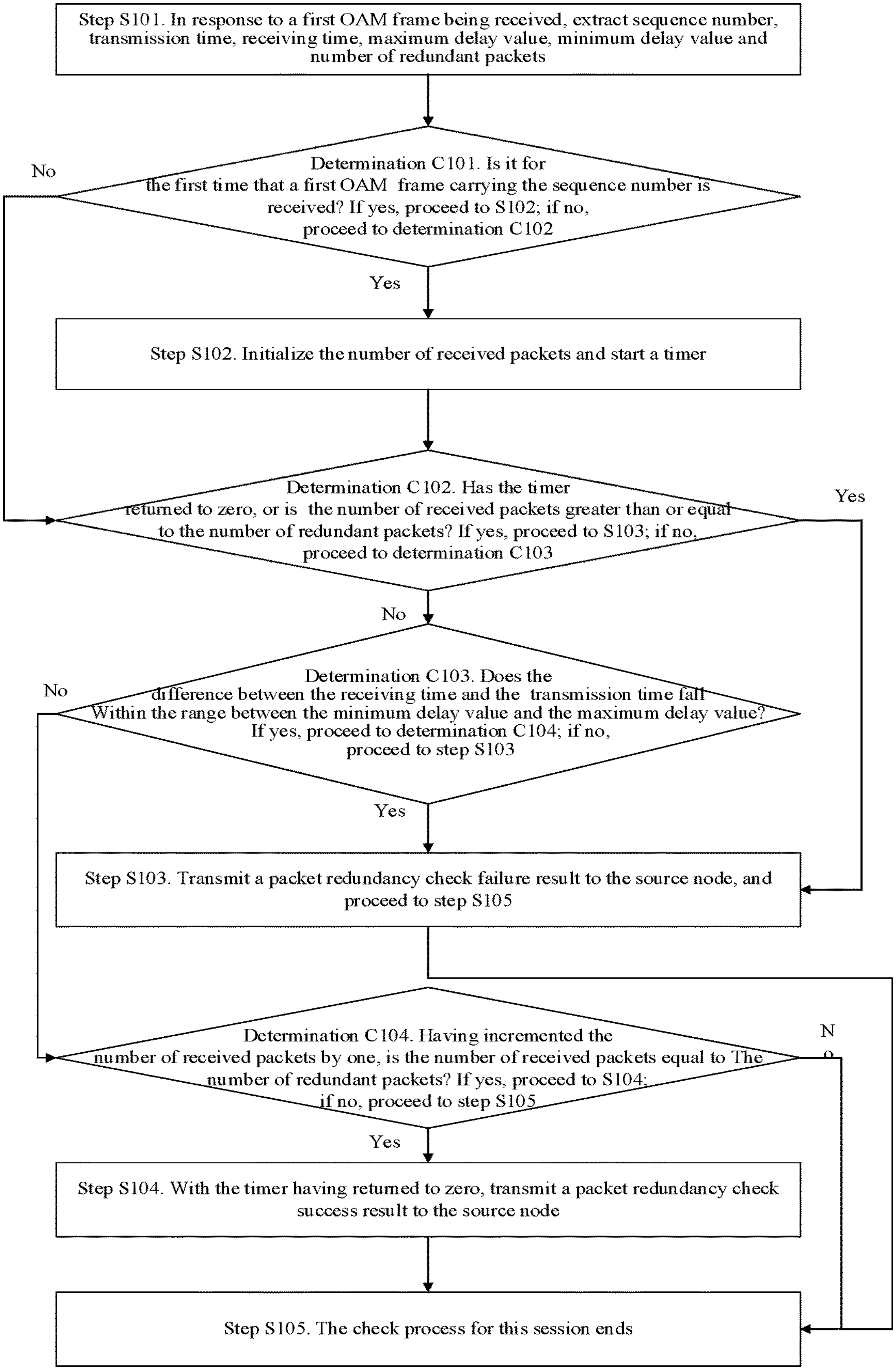
FIG. 11 is a flowchart of packet redundancy monitoring and checking according to an embodiment of the present disclosure.

Now referring to FIG. 11. FIG. 11 is a flowchart of packet redundancy monitoring and checking according to an embodiment of the present disclosure. The flowchart specifically includes steps S101 to S105.

At S101, in response to a first OAM frame being received, sequence number, transmission time, receiving time, maximum delay value, minimum delay value and number of redundant packets are extracted.

At C101, it is determined whether it is for the first time that a first OAM frame carrying the sequence number is received. If yes, the process proceeds to S102; and if no, the process proceeds to determination C102.

At S102, the number of received packets is initialized and a timer is started.

At C102, it is determined whether the timer has returned to zero, or whether the number of received packets is greater than or equal to the number of redundant packets. If yes, the process proceeds to S103; and if no, the process proceeds to determination C103.

At C103, it is determined whether the difference between the receiving time and the transmission time falls within the range between the minimum delay value and the maximum delay value. If yes, the process proceeds to determination C104; and if no, the process proceeds to step S103.

At S103, a packet redundancy check failure result is transmitted to the source node, and the process proceeds to step S105.

At C104, having incremented the number of received packets by one, it is determined whether the number of received packets is equal to the number of redundant packets. If yes, the process proceeds to S104; and if no, the process proceeds to step S105.

At S104, with the timer having returned to zero, a packet redundancy check success result is transmitted to the source node.

At S105, the check process for this session ends.

It can be understood that the timing duration of the timer is calculated from the transmission time, the receiving time and the maximum delay value, and the timing duration may be a value obtained by adding the maximum delay value to the difference between the receiving time and the transmission time. When the number of received packets equals the number of redundant packets and no first OAM frame with the same sequence number is received within the remaining countdown of the timer, it can be considered that the message redundancy check is successful, and a packet redundancy check success result is sent to the source node. When the number of received packets equals the number of redundant packets and there is still the first OAM frame(s) with the same sequence number being received within the remaining countdown of the timer, it can be considered that the message redundancy check has failed, and a packet redundancy check failure result is sent to the source node.

In an example, the target node receives a first OAM frame with the sequence number of 123 at a first receiving time of 123457000 and a second OAM frame with the sequence number of 123 at a second receiving time of 123457100.

On the basis of the packet redundancy check process shown in FIG. 11, the process of the target node receiving the first OAM frame for the first time for checking packet redundancy is specifically described below in (1) to (7).

(1) A first OAM frame is received, and the check data are extracted as follows: the sequence number is 123, the first receiving time is 12345600, the transmission time is 123456666, the maximum delay value is 800, the minimum delay value is 300, and the number of redundant packets is 2.

(2) A first OAM frame with sequence number 123 is received for the first time.

(3) the number of received packets is initialized to 0, the timer is started, and the countdown is started at a value obtained by adding the maximum delay value to the difference between the receiving time and the transmission time, that is, 123456666+800−123457000=466.

(4) The timer has not returned to 0 and the number of received packets is less than the number of redundant packets.

(5) The difference between the transmission time and the first receiving time is 334, so the difference is greater than the minimum delay value and less than the maximum delay value, thereby incrementing the number of received packets by 1.

(6) The number of received packets is not equal to the number of redundant packets.

(7) The check process for this session ends.

Further, on the basis of the packet redundancy check process shown in FIG. 11, the process of the target node receiving the first OAM frame with the same sequence number for not the first time for checking packet redundancy is specifically described below in (1) to (6).

(1) A first OAM frame is received, and the check data are extracted as follows: the sequence number is 123, the second receiving time is 123457100, the transmission time is 123456666, the maximum delay value is 800, the minimum delay value is 300, and the number of redundant packets is 2.

(2) A first OAM frame with sequence number 123 is received for not the first time.

(3) The timer has not returned to 0 and the number of received packets is 1, that is, the number of received packets is less than the number of redundant packets.

(4) The difference between the transmission time and the second receiving time is 434, so the difference is greater than the minimum delay value and less than the maximum delay value, thereby incrementing the number of received packets by 1, and now the number of received packets is 2.

(5) If the number of received packets is equal to the number of redundant packets, and the third first OAM frame with sequence number 123 is not received before the timer returns to zero, a packet redundancy check success result is sent to the source node.

(6) The check process for this session ends.

Figure 12:
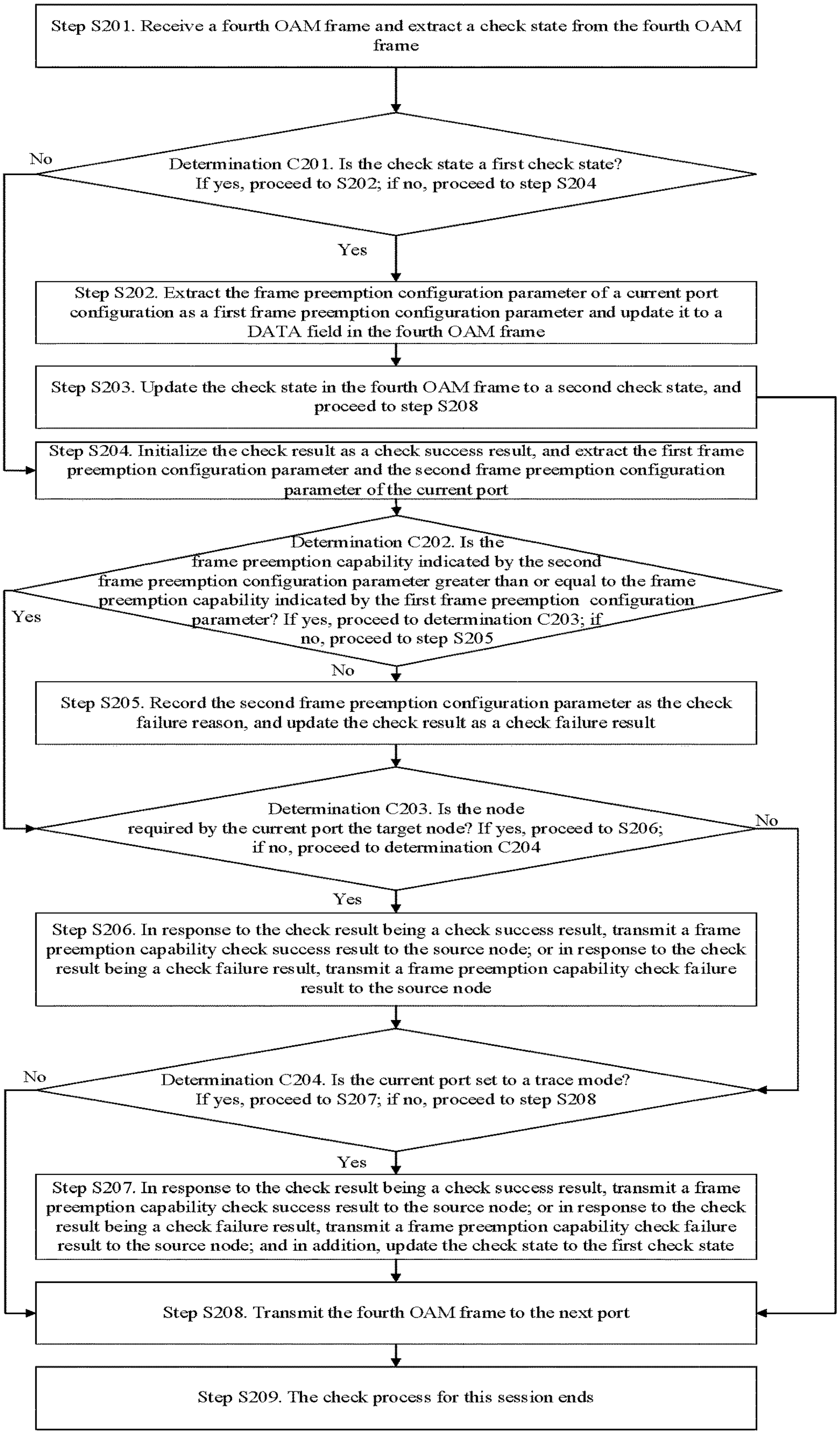
FIG. 12 is a flowchart of frame preemption capability monitoring and checking according to an embodiment of the present disclosure.

Now referring to FIG. 12. FIG. 12 is a flowchart of frame preemption capability monitoring and checking according to an embodiment of the present disclosure. The flowchart specifically includes steps S201 to S209.

At S201, a fourth OAM frame is received, and a check state is extracted from the fourth OAM frame.

At C201, it is determined whether the check state is a first check state? If yes, the process proceeds to S202; and if no, the process proceeds to step S204.

At S202, the frame preemption configuration parameter of a current port configuration is extracted as a first frame preemption configuration parameter and updated to a DATA field in the fourth OAM frame.

At S203, the check state in the fourth OAM frame is updated to a second check state, and the process proceeds to step S208.

At S204, the check result is initialized as a check success result, and the first frame preemption configuration parameter and the second frame preemption configuration parameter of the current port are extracted.

At C202, it is determined whether the frame preemption capability indicated by the second frame preemption configuration parameter is greater than or equal to the frame preemption capability indicated by the first frame preemption configuration parameter. If yes, the process proceeds to determination C203; and if no, the process proceeds to step S205.

At S205, the second frame preemption configuration parameter is recorded as the check failure reason, and the check result is updated as a check failure result.

At C203, it is determined whether the node required by the current port is the target node. If yes, the process proceeds to S206; and if no, the process proceeds to determination C204.

At S206, in response to the check result being a check success result, a frame preemption capability check success result is transmitted to the source node; or in response to the check result being a check failure result, a frame preemption capability check failure result is transmitted to the source node.

At C204, it is determined whether the current port is set to a trace mode If yes, the process proceeds to S207; and if no, the process proceeds to step S208.

At S207, in response to the check result being a check success result, a frame preemption capability check success result is transmitted to the source node; or in response to the check result being a check failure result, a frame preemption capability check failure result is transmitted to the source node; and in addition, the check state is updated to the first check state.

At S208, the fourth OAM frame is transmitted to the next port.

At S209, the check process for this session ends.

It can be understood that a plurality of ports, such as a receiving port and a transmitting port, may be included in a network node, and each of them can perform corresponding check operations based on the contents of the OAM frame. A network node receives an OAM frame from another node through the receiving port, and the receiving port carries out corresponding check processing according to the content of the OAM frame and transmits the frame to the transmitting port. The transmitting port receives the OAM frame from the receiving port, and carries out corresponding check processing according to the content of the OAM frame, and then transmits it to other nodes. Herein, the frame preemption configuration parameters of the ports of the same network node can be the same, that is, the frame preemption configuration parameter of the transmitting port and the frame preemption configuration parameter of the receiving port can be the same. When the port is configured in the trace mode, it is required to transmit the frame preemption capability check result to the source node. When the port is not configured in the trace mode, it is not necessary to transmit the frame preemption check result to the source node.

Now referring to FIG. 13. FIG. 13 is a schematic diagram of an interactive process of OAM frames for TSN network monitoring according to an embodiment of the present disclosure.

It can be understood that in the process of service performance check of TSN network, a source node transmits OAM frames to a target node, and the nodes along the link and the target node can return a check result of OAM frame to the source node according to the check data in the OAM frame. The way of returning the check result can be to report the check result to the control plane, or to construct an OAM check report message to be transmitted to the source node as the check result, or to transmit the check result to a specific node in the TSN network according to the content of the OAM frame.

It should be noted that the corresponding address parameters in OAM frames can be modified according to the performance that deterministic networks need to monitor. For example, in a power system or braking system in a vehicle network, if it is necessary to monitor and check the packet redundancy or packet cycle of a target node, the destination address in the OAM frame is configured as the address of the target node. For another example, when it is necessary to monitor and check the frame preemption capability of TSN, the frame preemption capability can be checked at the network nodes along the link, and the destination address in the OAM frame is configured as a special destination address, such as multicast address, which is used for identifying and processing the OAM frame by the network nodes along the link.

Now referring to FIG. 14. FIG. 14 is a schematic diagram of an OAM frame encapsulation format as a check result according to an embodiment of the present disclosure.

It can be understood that the operation code is stored in an OpCode field in the OAM frame, different operation codes are represented by changing the value of OpCode to indicate different types of OAM frames, while the data stored in a DATA field is used to indicate the success of the check or the failure of the check and the reason for the failure. For example, when the OpCode value in the OAM frame is 0x0B, the operation code can be labeled as a fourth operation code, indicating that the frame is a packet redundancy check result, then the DATA field in the OAM can store the check result result, the sequence number seqNo and the check failure reason failReason. For another example, when the OpCode value in the OAM frame is 0x0C, the operation code can be labeled as a fifth operation code, indicating that the frame is a packet cycle check result, then the DATA field in the OAM can store the check result result, the packet cycle value cycleValue, the fail packet number failPacketNo and the check failure reason failReason. In addition, when the OpCode value in the OAM frame is 0x0D, the operation code can be labeled as a sixth operation code, indicating that the frame is a frame preemption capability check result, then the DATA field in the OAM can store the check result result, the check failed node failNode, the check failed port failPort and the check failure reason failReason.

Figure 15:
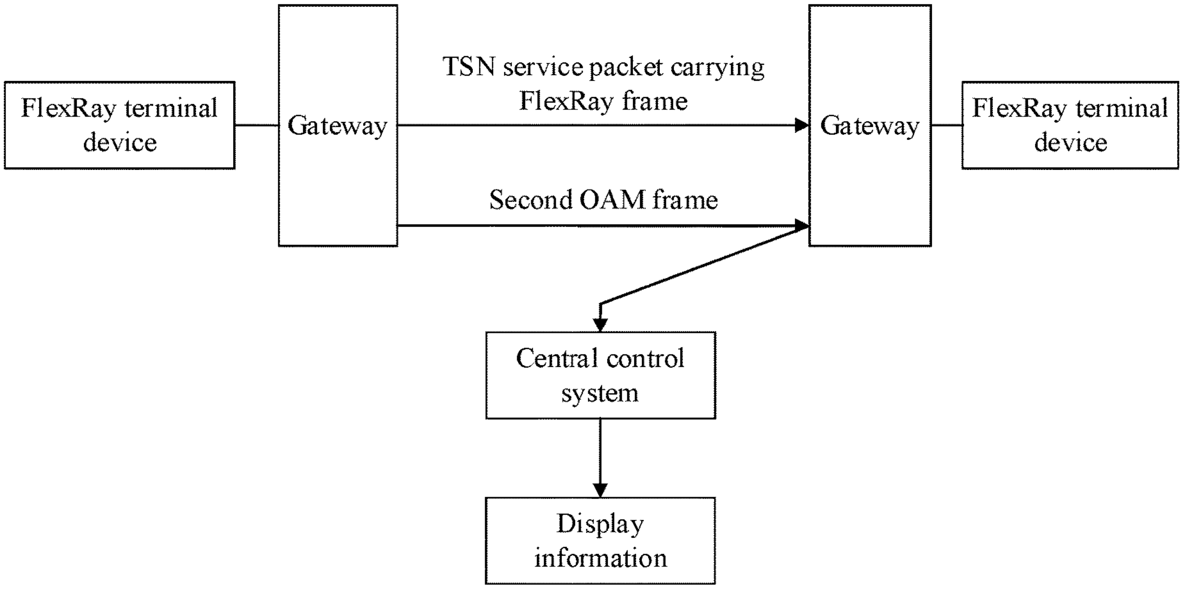
FIG. 15 is a schematic diagram of an application scenario of a network monitoring method according to an embodiment of the present disclosure.

Now referring to FIG. 15. FIG. 15 is a schematic diagram of an application scenario of a TSN network monitoring method according to an embodiment of the present disclosure.

It can be understood that the TSN network monitoring method can be applied to a vehicle bus network, such as the FlexRay vehicle bus network. In the automotive network electronic system using the FlexRay bus, the electronic control units of various terminal devices, such as the brake and transmission, need to support the transmitting and parsing of FlexRay frames. In the evolution of FlexRay bus to TSN network, if only the bus is replaced by TSN network without changing the capability of the terminal devices, it is necessary to arrange a gateway between the FlexRay terminal device and TSN network. The FlexRay terminal device uses the TSN network as a virtual FlexRay bus, and FlexRay packets can be carried in overlay mode in the TSN network.

If the FlexRay terminal device periodically sends deterministic service packets, the FlexRay packet cycle should be maintained during the transmission through the TSN network. In order to monitor the cycle of TSN packets carrying FlexRay frames, it is necessary to enable the OAM monitoring feature of TSN network between corresponding gateways, and to monitor the cycle transmission capability of TSN network in real-time by transmitting and monitoring the second OAM frames for cycle check.

In the process of constructing an OAM frame, the source node address and the target node address are the gateway addresses on two sides. In the DATA field of the second OAM frame, the packet cycle value can be the same as the deterministic packet cycle value of FlexRay, and the cycle jitter value and the fail packet rate can be configured according to the requirements of the FlexRay bus standard. Therefore, the cycle of the vehicle network can be monitored by the TSN network monitoring method, which can ensure the cycle of the FlexRay packets carried in the TSN network. If any issue occurs, the gateway will promptly return a check report message to the central control unit, and the central control unit can take corresponding actions according to the check report information, such as reminding the driver of the automobile network failure through a display, so as to meet the user requirements and improve the reliability of the TSN.

Figure 16:
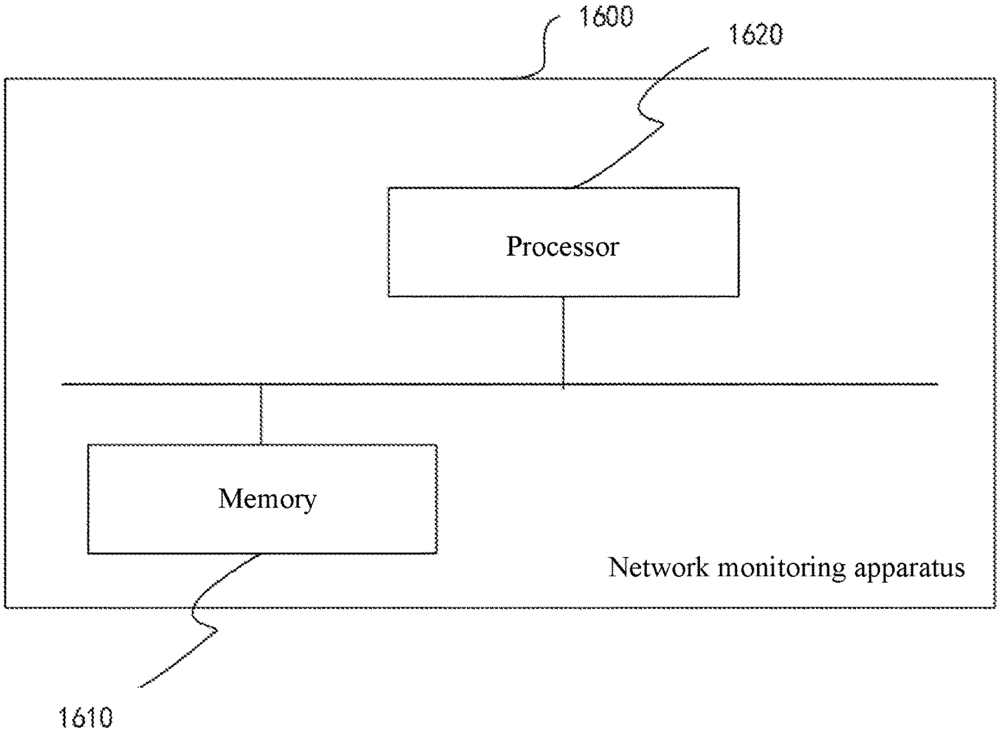
FIG. 16 is a schematic diagram of a network monitoring apparatus according to an embodiment of the present disclosure.

Now referring to FIG. 16. FIG. 16 shows a network monitoring apparatus 1600 according to an embodiment of the present disclosure. The network monitoring apparatus 1600 includes but is not limited to a memory 1610 and a processor 1620.

The memory 1610 is configured to store a program.

The processor 1620 is configured to execute the program stored in the memory 1610. When the processor 1620 executes the computer program stored in the memory 1610, the processor 1620 is caused to perform the network monitoring method described above.

The processor 1620 and the memory 1610 may be connected by a bus or by other means.

As a non-transitory computer-readable storage medium, the memory 1610 may be configured to store a non-transitory software program and a non-transitory computer-executable program, for example, the network monitoring method described in any of the embodiments of the present disclosure. The processor 1620 implements the network monitoring method described above by running a non-transitory software program and instructions stored in the memory 1610.

The memory 1610 may include a storage program area and a storage data area, where the program storage area may store an operating system and application program(s) required by at least one feature, and the storage data area can store data required for the execution of the network monitoring method described above. In addition, the memory 1610 may include a high-speed random access memory and a non-transitory memory, for example, at least one magnetic disk storage device, a flash memory device, or another non-transitory solid-state storage device. In some implementations, the memory 1610 may optionally include remote memories remotely located with respect to the processor 1620, and these remote memories may be connected to the processor 1620 via a network. Examples of the above-mentioned network include the Internet, an intranet, a local area network, a mobile communication network, and a combination thereof.

The non-transitory software program and the instructions required to carry out the network monitoring method described above are stored in the memory 1610, and when executed by at least one processor 1620, cause the at least one processor to perform the network monitoring method according to any of the embodiments of the present disclosure.

A further embodiment of the present disclosure provides a storage medium storing computer-executable instructions for performing the network monitoring method described above.

In an embodiment, the storage medium stores computer-executable instructions which, when executed by at least one control processor, for example, by one of the above-mentioned network devices, cause the above-mentioned at least one processor to perform the network monitoring method according to any of the embodiments of the present disclosure.

The embodiments described above are only for illustration. The units described as separate components may or may not be physically separated, that is, they may be located at one place or distributed to multiple network units. Depending on the specific requirements, some or all of the modules may be selected to achieve the purpose of the embodiment.

It can be understood by those of ordinary skill in the art that all or some of the steps of the methods and systems disclosed above may be implemented as software, firmware, hardware, and appropriate combinations thereof. Some or all of the physical components may be implemented as software executed by a processor, such as a central processing unit, a digital signal processor or a microprocessor, or as hardware, or as an integrated circuit, such as an application-specific integrated circuit. Such software may be distributed on computer-readable media, which may include computer-readable storage media (or non-transitory media) and communication media (or transitory media). As well known to those of ordinary skill in the art, the term computer-readable storage medium includes volatile and nonvolatile, removable and non-removable media implemented in any method or technique for storing information, such as computer-readable instructions, data structures, program modules or other data. A computer-readable storage medium includes but is not limited to RAM, ROM, EEPROM, flash memory or other memory technologies, CD-ROM, digital versatile disk (DVD) or other optical disk storage, cassettes, magnetic tapes, magnetic disk storage or other magnetic storage apparatuses, or any other medium that can be configured to store desired information and can be accessed by a computer. Furthermore, it is well known to those of ordinary skill in the art that communication media typically contain computer-readable instructions, data structures, program modules or other data in a modulated data signal such as a carrier wave or other transmission mechanism, and can include any information delivery media.

An embodiment of the present disclosure includes: receiving an OAM frame from a source node, where the OAM frame includes an operation code and check data corresponding to the operation code, and the OAM frame is used for checking service performance of the TSN network; performing check processing on performance of a deterministic network according to the operation code and the check data to obtain a check result; and transmitting the check result to the source node. According to the scheme provided in the embodiments of the present disclosure, an OAM frame includes an operation code and check data, where different operation codes correspond to different check data, and the check data may include configuration parameters of the TSN network. The target node can check the performance of the deterministic network by using the operation code and check data in the OAM frame, then get a check result, and return the check result to the source node. By extending the OAM frame, different OAM frames can have different operation codes and different check data, and the operation code correspond to the check data. As a result, the target node can check different performance aspects of the deterministic network based on different operation codes and check data. This enhances the versatility of TSN network monitoring features, enabling monitoring of TSN network service performance, and allowing users to understand the service state of the TSN network, thereby improving the reliability of TSN.

The detailed description above pertains to several embodiments of this disclosure. However, the present disclosure is not limited to the above-mentioned embodiments. Those of ordinary skill in the art can also make various equivalent modifications or replacements without departing from the concept of the present disclosure, and these equivalent modifications or replacements are all included in the scope defined by the claims of the present disclosure.

What is claimed is:

1. A network monitoring method, applied to a target node deployed in a time-sensitive networking (TSN) network, the method comprising:

receiving an Operations, Administration, and Maintenance (OAM) frame from a source node, wherein the OAM frame comprises an operation code and check data corresponding to the operation code, and the OAM frame is used for checking service performance of the TSN network;

performing check processing on performance of a deterministic network according to the operation code and the check data to obtain a check result; and transmitting the check result to the source node;

wherein the performance of the deterministic network comprises frame preemption capability, and in response to the operation code being a third operation code, the check data comprise a first frame preemption configuration parameter, the first frame preemption configuration parameter being configured to indicate frame preemption capability information of the source node; and performing check processing on the performance of the deterministic network according to the operation code and the check data to obtain the check result comprises the steps of:

acquiring a second frame preemption configuration parameter, wherein the second frame preemption configuration parameter is configured to indicate frame preemption capability information of a current node; and obtaining a frame preemption check result according to the first frame preemption configuration parameter and the second frame preemption configuration parameter.

2. The network monitoring method of claim 1, wherein the performance of the deterministic network further comprises at least one of:

packet redundancy; or packet cycle; of frame preemption capability.

3. The network monitoring method of claim 2, wherein in response to the operation code being a first operation code, the check data comprise:

sequence number, number of redundant packets, first receiving time, transmission time, maximum delay value, and minimum delay value;

performing check processing on performance of the deterministic network according to the operation code and the check data to obtain the check result comprises the steps of:

obtaining a number of received packets according to a timing duration, the sequence numbers of the received packets being the same, and the timing duration being obtained according to the first receiving time, the transmission time and the maximum delay value; and obtaining a packet redundancy check result according to the number of received packets, the number of redundant packets, and a time comparison result, wherein the time comparison result is obtained by comparing a difference between the first receiving time and the transmission time with a difference between the maximum delay value and the minimum delay value.

4. The network monitoring method of claim 2, wherein in response to the operation code being a second operation code, the check data comprise:

second receiving time, packet cycle value, cycle jitter value, and fail packet rate; and performing check processing on performance of the deterministic network according to the operation code and the check data to obtain the check result comprises the steps of:

obtaining a number of fail packets according to the fail packet rate and a preset number threshold;

for each OAM frame of a plurality of received OAM frames, obtaining a first check result corresponding to said each OAM frame according to a time difference between the second receiving time and a third receiving time and a packet cycle condition, wherein the packet cycle condition is obtained according to the packet cycle value and the cycle jitter value, the third receiving time is a receiving time of a previous OAM frame, and a number of the plurality of received OAM frames is less than or equal to the preset number threshold; and obtaining a packet cycle check result according to the first check results corresponding to the plurality of received OAM frames and the number of fail packets.

5. A network monitoring method, applied to a source node deployed in a time-sensitive networking (TSN) network, the method comprising:

transmitting an Operations, Administration, and Maintenance (OAM) frame to a target node, wherein the OAM frame comprises an operation code and check data corresponding to the operation code, and the OAM frame is used for checking service performance of the TSN network, wherein the target node performs check processing on performance of a deterministic network according to the operation code and the check data to obtain a check result and transmit the check result to the source node; and receiving the check result from the target node;

wherein in response to the operation code being a third operation code, the check data are fourth check data; and transmitting the OAM frame to the target node comprises the steps of:

acquiring a check state, wherein the check state is configured to indicate state information of a current node;

in response to the check state being a first check state, acquiring a first frame preemption configuration parameter, wherein the first frame preemption configuration parameter is configured to indicate frame preemption capability information of the source node;

updating the check data according to the first frame preemption configuration parameter, and updating the check state to a second check state; and transmitting a fourth OAM frame to the target node, wherein the fourth OAM frame comprises the third operation code and the fourth check data, and the fourth check data comprise the first frame preemption configuration parameter and the check state, wherein the target node, in response to the check state being a second check state, obtains a frame preemption check result according to the fourth OAM frame and a second frame preemption configuration parameter, wherein the second frame preemption configuration parameter is configured to indicate frame preemption capability information of a current node, and the target node updates the check state to the first check state.

6. The network monitoring method of claim 5, wherein in response to the operation code being a first operation code, the check data are first check data; and transmitting the OAM frame to the target node comprises the steps of:

transmitting a first OAM frame to a target node, wherein the first OAM frame comprises the first operation code and the first check data, and the first check data comprise sequence number, number of redundant packets, first receiving time, transmission time, maximum delay value, and minimum delay value, wherein the target node obtains a packet redundancy check result according to the first OAM frame.

7. The network monitoring method of claim 5, wherein in response to the operation code being a second operation code, the check data are second check data; and transmitting the OAM frame to the target node comprises the steps of:

transmitting a second OAM frame to a target node, wherein the second OAM frame comprises the second operation code and the second check data, and the second check data comprise second receiving time, packet cycle value, cycle jitter value, and fail packet rate, wherein the target node obtains a packet cycle check result according to the second OAM frame and a preset number threshold.

8. The network monitoring method of claim 5, wherein in response to the operation code being a third operation code, the check data comprise third check data; and transmitting the OAM frame to the target node comprises the steps of:

acquiring a first frame preemption configuration parameter, wherein the first frame preemption configuration parameter is configured to indicate frame preemption capability information of the source node;

updating the check data according to the first frame preemption configuration parameter; and transmitting a third OAM frame to a target node, wherein the third OAM frame comprises the third operation code and the third check data, and the third check data comprise the first frame preemption configuration parameter, wherein the target node obtains a frame preemption check result according to the third OAM frame and a second frame preemption configuration parameter, wherein the second frame preemption configuration parameter is configured to indicate frame preemption capability information of a current node.

9. A network monitoring apparatus, comprising a memory, a processor, and a computer program stored in the memory and executable by the processor, wherein the computer program, when executed by the processor, causes the processor to carry out the network monitoring method of claim 1.

10. A non-transitory computer-readable storage medium storing a computer program which, when executed by a processor, causes the processor to carry out the network monitoring method of claim 1.

11. A network monitoring apparatus, comprising a memory, a processor, and a computer program stored in the memory and executable by the processor, wherein the computer program, when executed by the processor, causes the processor to carry out the network monitoring method of claim 5.

12. A non-transitory computer-readable storage medium storing a computer program which, when executed by a processor, causes the processor to carry out the network monitoring method of claim 5.

* * * * *